May 3, 1960 — B. G. FORMAN — 2,935,552

NARROW DIAMETER NON-CONDUCTIVE FASTENER

Filed April 27, 1959

United States Patent Office 2,935,552
Patented May 3, 1960

2,935,552

NARROW DIAMETER NON-CONDUCTIVE FASTENER

Benjamin G. Forman, Kew Gardens, N.Y.

Application April 27, 1959, Serial No. 809,196

4 Claims. (Cl. 174—138)

This invention relates generally to the field of threaded fastening devices of the type disclosed in my prior Patent No. 2,432,986, granted December 23, 1947, entitled "Non-Conductive Fastener," and more particularly to improved form thereof particularly adaptable for use as a bolt of relatively narrow diameter.

Where the fastener is formed as a screw which is tightened by means of a driver, the teachings of the above mentioned Patent No. 2,432,986 may be followed with little difficulty. However, the increased use of small bolts, which are normally tightened by engagement of a tool with a polygonally shaped head, a bolt made with a metallic core of constant diameter is not sufficiently rigid to withstand the higher torques employed in the tightening of bolt-type fasteners, as opposed to screwdriver driven fasteners. This is particularly true where the threaded shank portions are of relatively narrow diameter, wherein failure and breakage of the fastener will normally occur along the plane of interconnection between the head element and the threaded shank element.

The prior art constructions have also suffered from a disadvantage in that the reinforcing metal core must normally be insert molded with the synthetic resinous portions of the device in order that an adequate bond between the core and the synthetic resin be obtained. While this practice is not objectionable in the case of larger sized non-conductive fasteners, the process is relatively expensive, and in the case of smaller fasteners, constructions of this type are unduly expensive.

It is therefore among the principal objects of the present invention to provide an improved narrow diameter non-conductive fastener of the class described which may be formed as a bolt rather than a screw, and in which the polygonally shaped tool engaging head may be of synthetic resinous material, rather than a metallic portion of the inner core.

Another object of the invention lies in the provision of an improved bolt-type non-conductive fastener of relatively narrow diameter, in which the interconnection of the head element, with the threaded shank element, is internally reinforced with a view to preventing failure occurring between the two elements.

Still another object of the invention lies in the provision of an improved non-conductive fastener in which the core element may be mechanically inserted within a cavity in a previously formed outer synthetic resinous element.

Still another object of the invention lies in the provision of a non-conductive fastener of the class described in which the cost of fabrication may be of a reasonably low order, with consequent wide sale, distribution and use.

A feature of the invention lies in the fact that the inserted metallic core element provides greatest reinforcement of the synthetic resinous element at the point of greatest stress.

Another feature of the invention lies in the improved reinforcement of the synthetic resinous head element, to enable engagement of a tightening tool directly upon the synthetic resinous outer surfaces thereof.

These objects and features, as well as other incidental ends and advantages, will more fully appear in the course of the following disclosure, and be pointed out in the appended claims.

In the drawing, to which reference will be made in the specification, similar reference characters have been employed to designate corresponding parts throughout the several views.

Figure 1:
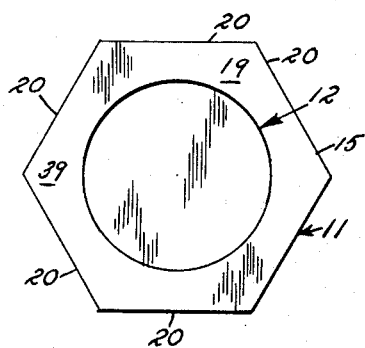
Figure 1 is a plan view of an embodiment of the invention.
Figure 2:
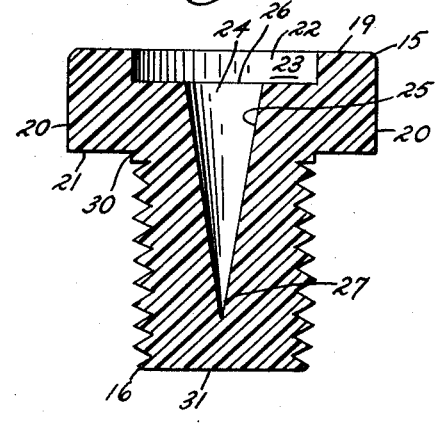
Figure 2 is a vertical longitudinal central sectional view thereof.
Figure 3:
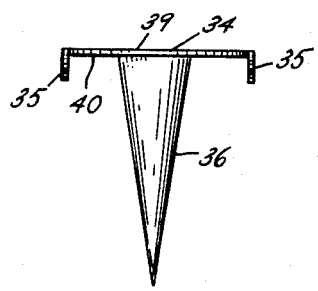
Figure 3 is a side elevational view of the metallic core element comprising a part of the embodiment.

In accordance with the invention, the device, generally indicated by reference character 10, comprises broadly: a synthetic resinous threaded element 11 and a metallic core element 12.

The synthetic resinous threaded element 11 may be of any desired synthetic resinous material having a suitable degree of mechanical strength, as for example, nylon. It includes a hexagonally or polygonally shaped head member 15 formed integrally with a threaded shank member 16.

The head member 15 is of conventional outer configuration, including an upper surface 19, side surfaces 20, and a lower surface 21. A first recess 22 extends inwardly from the upper surface 19, and includes a cylindrical surface 23 as well as a lower surface 24 which lies generally parallel to that of the upper surface 19. A second recess 25 commences at the lower surface 24, and extends from the mouth 26 thereof inwardly into the shank member 16 to terminate at a relatively pointed end 27. The cross sectional shape is preferably non-circular so as to be capable of imparting a transmitted torque to the threaded shank member 16. In the relatively narrow diameters of threaded shank 16 contemplated by the present invention, serrating the exposed surface, or the provision of tapered flutes are not practical.

The threaded shank member 16 is generally cylindrical in configuration, including an outer threaded surface 29, an upper end 30 which interconnects with the head element 15 and a lower end 31 of conventional configuration.

The metallic core element 12 may be formed as a multi-stage extrusion, as a die casting, or, in the case of fastening devices, having a shank of relatively short length, as a simple stamping. The core element includes a relatively flat head member 34, a plurality of lug members 35, and a tapered shank member 36 substantially centrally disposed with respect to the head member 34. The head member 34 includes an upper surface 39, a lower surface 40 and a peripheral edge surface 41. The lug members 35 are generally peripherally located, each including a sharpened tip 43 adapted to project into the body of the head member 15, wherein the lower surface 40 of the head member 34 may lie upon the surface 24 of the first recess 22. In this position, the shank member 36 may project into the second recess 25 in the threaded shank member 16 to wedge itself therein. Owing to the fact that both the lug members 35 and the shank member 36 are tapered, the entire core element 12 may be driven into engagement within the synthetic resinous threaded element 11 after formation of the latter through ordinary molding technique.

Figure 4:
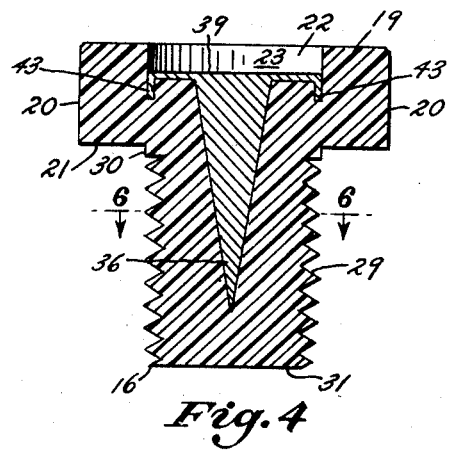
Figure 4 is a vertical longitudinal sectional view corresponding to that seen in Figure 2, but showing the metallic core element in place.
Figure 6:
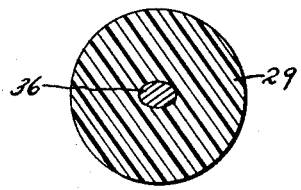
Figure 6 is a horizontal transverse sectional view as seen from the plane 6—6 on Figure 4.
Figure 5:
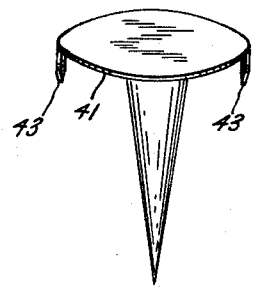
Figure 5 is a view in perspective of the metallic core element.

From a consideration of Figure 4, it will be apparent that when the core element 12 is engaged within the synthetic resinous element 11, a metallic reinforcement occurs between the head and shank members of the latter. Torque applied to the polygonal surfaces 20 of the head 15 are transmitted through the lug members 35 and the head member 34 to the tapered shank member 36, which in turn imparts its torque to the threaded shank member 16. Thus, while an initial strain may occur, it is of a relatively minor degree just sufficient to compensate for the normal elasticity of the synthetic resinous element 11. Following this the torque is transmitted through the relatively rigid metallic core to be exerted directly against the threaded shank member. By virtue of the presence of the generally circular head member 34, all of the side members are reinforced to a degree where normal deformation of the same under the action of the tool employed is well within permissible limits.

It may thus be seen that I have invented novel and highly useful improvements in non-conductive fastener construction, particularly adapted for use in conjunction with threaded shank members of relatively narrow diameter or gauge. By reinforcing the interconnection between the head and shank members, the points of greatest weakness, and by forming a shank engaging member of tapered configuration, it is possible to form the synthetic resinous and metallic elements of the device separately and integrate the same by simple mechanical means. This construction not only facilitates the manufacture of relatively small sized fasteners of this type, but materially reduces the cost of fabrication to a level directly comparable with all synthetic resinous type construction.

I wish it to be understood that I do not consider the invention limited to the precise details of structure shown and set forth in this specification, for obvious modifications will occur to those skilled in the art to which the invention relates.

I claim:

1. In a composite non-conductive fastener including a synthetic resinous outer threaded element and a metallic core element, the improvement comprising: said threaded element including a polygonally shaped head and a threaded shank member formed integrally therewith, said head including a recess therein; said threaded shank member having a second recess therein communicating at a first upper end thereof with said first mentioned recess, said second recess being of a width substantially less than that of said first mentioned recess; said metallic core element including a head member, a substantially centrally disposed shank engaging member extending outwardly along an axis substantially perpendicular to said head member, and lug means substantially peripherally disposed upon said head member, said core element being positioned within said first mentioned and second recesses in such manner that torque applied to said polygonally shaped head of said synthetic resinous element is transmitted through said lug means to said shank engaging member and said threaded shank member of said synthetic resinous element.

2. In a composite non-conductive fastener including a synthetic resinous outer threaded element and a metallic core element, the improvement comprising: said threaded element including a polygonally shaped head and a threaded shank member formed integrally therewith, said head including a recess therein; said threaded shank member having a second recess therein communicating at a first upper end thereof with said first mentioned recess, said second recess being of a width substantially less than that of said first mentioned recess; said metallic core element including a head member, a substantially centrally disposed shank engaging member extending outwardly along an axis substantially perpendicular to said head member, said shank engaging member being of a non-circular cross-section; and lug means substantially peripherally disposed upon said head member, said core element being positioned within said first mentioned and second recesses in such manner that torque applied to said polygonally shaped head of said synthetic resinous element is transmitted through said lug means to said shank engaging member and said threaded shank member of said synthetic resinous element.

3. In a composite non-conductive fastener including a synthetic resinous outer threaded element, and a metallic core element, the improvement comprising: said threaded element including a polygonally shaped head and a threaded shank member formed integrally therewith, said head including a generally cylindrical recess therein, said threaded shank member having a second elongated recess therein of non-circular cross-section and communicating at a first upper end thereof with said first mentioned cylindrical recess, said second recess being of a width substantially less than that of said cylindrical recess; said metallic core element including a relatively planar head member, a substantially centrally disposed shank engaging member, extending outwardly along an axis substantially perpendicular therefrom, and lug means substantially peripherally disposed upon said head member and extending along axes substantially parallel to that of said shank engaging member; said core element being positioned within said first and second recesses in such manner that torque applied to said head member of said synthetic resinous element is transmitted through said lug means through said shank engaging member and said threaded shank member.

4. In a composite non-conductive fastener including a synthetic resinous outer threaded element and a metallic core element, the improvement comprising said threaded element including a polygonally shaped head and a threaded shank member formed integrally therewith, said head including a recess therein; said threaded shank member having a second recess therein communicating at a first upper end thereof with said first mentioned recess, said second recess being of a width substantially less than that of said first mentioned recess; said metallic core element including a head member, a substantially centrally disposed shank-engaging member extending outwardly along an axis substantially perpendicular to said head member, said shank-engaging member being of a non-circular tapered cross-section; and lug means substantially peripherally disposed upon said head member, said core element being positioned within said first mentioned and second recesses in such manner that torque applied to said polygonally shaped head of said synthetic resinous element is transmitted through said lug means to said shank-engaging member and said threaded shank member of said synthetic resinous element.

References Cited in the file of this patent
UNITED STATES PATENTS

| | | |
|---|---|---|
| 2,890,845 | Kiekhaefer | June 16, 1959 |

FOREIGN PATENTS

| | | |
|---|---|---|
| 53,665 | Netherlands | Dec. 15, 1942 |